United States Patent Office.

WILHELM MUTTER, OF SYRACUSE, NEW YORK.

FLUX FOR WELDING METALS.

SPECIFICATION forming part of Letters Patent No. 282,464, dated July 31, 1883.

Application filed November 2, 1882. (No specimens.)

*To all whom it may concern:*

Be it known that I, WILHELM MUTTER, of Syracuse, in the county of Onondaga, in the State of New York, have invented new and useful Improvements in Flux for Welding Metals, of which the following is a full, clear, and exact description.

This invention consists in the utilization of the waste saline crystals which usually accumulate around the exterior of the evaporating-vats of solar salt-works.

In my researches for a cheap and efficient substitute for borax as a flux for welding metals I have, after studious and many careful and thorough experiments, discovered that I can successfully and most effectually weld iron and steel by the use of the saline crystals which usually form around the exterior of the vats or tanks employed for evaporating saline water by solar heat, and which substance has hitherto been deemed worthless for any purpose whatever. These saline crystals, which are usually of a reddish or brownish tint, I grind to a powder, and use this powder in the same manner as borax is used for welding metals—*i. e.*, I first heat the parts to be united to a high red heat, then sprinkle upon the surfaces to be joined a small quantity of the aforesaid powder, which will thereby become melted and caused to run over the said surfaces like oil, then, after reheating the said parts to the usual temperature required for welding iron, I weld them together by hammering, rolling, or any other of the well-known methods.

I have found that by the use of this my newly-discovered flux cast-steel can be welded as readily and effectively as wrought-iron, and that even cast-steel which has been burned or injured by over-heating will be restored to its original grain, hardness, and tenacity by treating the same with the aforesaid flux.

I have also found that by admixing with the aforesaid powder a small quantity of borax said powder is caused to melt quicker and adhere better to the surfaces to be joined.

Having described my invention, what I claim as new, and desire to secure by Letters Patent, is—

1. As a new article of merchandise, a flux for welding metals, composed of the waste saline crystals formed on the exterior of evaporating-vats of solar salt-works, substantially as set forth.

2. A flux for welding metals, consisting of a mixture of borax and saline crystals, substantially as specified.

In testimony whereof I have hereunto signed my name, in the presence of two attesting witnesses, at Syracuse, in the county of Onondaga, in the State of New York, this 28th day of October, 1882.

WILHELM MUTTER. [L. S.]

Witnesses:
WM. C. RAYMOND,
FREDERICK H. GIBBS.